(12) United States Patent
Im et al.

(10) Patent No.: US 11,982,924 B2
(45) Date of Patent: May 14, 2024

(54) CAMERA MODULE

(71) Applicant: SAMSUNG ELECTRO-MECHANICS CO., LTD., Suwon-si (KR)

(72) Inventors: Ah Hyeon Im, Suwon-si (KR); Ta Kyoung Lee, Suwon-si (KR); Jung Woo Kim, Suwon-si (KR); Kyeong Jun Kim, Suwon-si (KR); Jae Hyuk Kim, Suwon-si (KR); Do Seop Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 217 days.

(21) Appl. No.: 17/397,014

(22) Filed: Aug. 9, 2021

(65) Prior Publication Data
US 2022/0099947 A1 Mar. 31, 2022

(30) Foreign Application Priority Data

Sep. 29, 2020 (KR) .......................... 10-2020-0127467
Jan. 26, 2021 (KR) .......................... 10-2021-0010811

(51) Int. Cl.
G02B 7/02 (2021.01)
G02B 7/08 (2021.01)
(Continued)

(52) U.S. Cl.
CPC ............. *G03B 17/17* (2013.01); *G02B 7/021* (2013.01); *G02B 7/08* (2013.01); *G02B 7/09* (2013.01);
(Continued)

(58) Field of Classification Search
CPC .......... G02B 7/02–105; G02B 13/0065; G02B 13/007; G02B 27/646
See application file for complete search history.

(56) References Cited

U.S. PATENT DOCUMENTS 7,715,704 B2 * 5/2010 Chen ...................... H04N 23/55
396/133
11,102,387 B2 * 8/2021 Lee .................... G02B 13/0065
(Continued)

FOREIGN PATENT DOCUMENTS

KR 10-2014-0015269 A 2/2014
KR 10-2019-0119832 A 10/2019
(Continued)

OTHER PUBLICATIONS

Korean Office Action dated Apr. 15, 2022, in the counterpart Korean Patent Application No. 10-2021-0010811. (8 pages in English and 6 pages in Korean).

Primary Examiner — Leon W Rhodes, Jr.
(74) Attorney, Agent, or Firm — NSIP Law

(57) ABSTRACT

A camera module includes a housing, a lens holder configured to move in the housing in an optical axis direction, and a lens barrel coupled to the lens holder, wherein the lens holder includes a first support structure extending from one side surface in the optical axis direction and a second support structure located on a side surface opposite to the first support structure and extending in the optical axis direction, and the first support structure includes an extension protruding beyond the second support structure in the optical axis direction.

21 Claims, 11 Drawing Sheets

(51) Int. Cl.
*G02B 7/09* (2021.01)
*G02B 13/00* (2006.01)
*G02B 27/64* (2006.01)
*G03B 5/00* (2021.01)
*G03B 13/36* (2021.01)
*G03B 17/17* (2021.01)

(52) U.S. Cl.
CPC ....... *G02B 13/0065* (2013.01); *G02B 27/646* (2013.01); *G03B 5/00* (2013.01); *G03B 13/36* (2013.01); *G03B 2205/0007* (2013.01); *G03B 2205/0046* (2013.01)

(56) References Cited

U.S. PATENT DOCUMENTS

| | | |
|---|---|---|
| 11,496,657 B2 * | 11/2022 | Lee ........................ G03B 37/00 |
| 2018/0364450 A1 | 12/2018 | Lee et al. |
| 2020/0137274 A1 | 4/2020 | Lee et al. |
| 2021/0136261 A1 | 5/2021 | Lee |

FOREIGN PATENT DOCUMENTS

| | | |
|---|---|---|
| KR | 10-2072811 B1 | 3/2020 |
| KR | 10-2020-0047275 A | 5/2020 |
| KR | 10-2110025 B1 | 5/2020 |
| KR | 10-2020-0101963 A | 8/2020 |
| WO | WO 2012/051358 A2 | 4/2012 |
| WO | WO 2018/007981 A1 | 1/2018 |
| WO | WO 2019/148027 A1 | 8/2019 |

* cited by examiner

CAMERA MODULE

CROSS-REFERENCE TO RELATED APPLICATIONS

This application claims the benefit under 35 USC 119(a) of Korean Patent Application Nos. 10-2020-0127467 filed on Sep. 29, 2020, and 10-2021-0010811 filed on Jan. 26, 2021, in the Korean Intellectual Property Office, the entire disclosures of which are incorporated herein by reference for all purposes.

BACKGROUND

1. Field

The present disclosure relates to a camera module, and more particularly, to a structure capable of switching a path of light collected by a camera at least once.

2. Description of the Background

Camera modules provided in mobile devices have been manufactured to have levels of performance comparable to those of traditional cameras. In particular, as the frequency of capturing images using mobile devices increases, demand for camera modules capable of providing high zoom magnification has increased.

Meanwhile, in order to increase zoom magnification, a distance for light incident in a camera to move to an image sensor, that is, a total track length (TTL), has to be increased, and in order to realize a relatively long total track length, an overall length of the camera may be increased.

Recent camera modules have been provided with a relatively long total track length realized by switching light coming from the rear of a mobile device by about 90 degrees using a reflector such as a prism. However, even such a camera module including a reflector has a limitation in further increasing zoom magnification.

Meanwhile, zoom magnification may be adjusted by increasing or decreasing a distance between a lens and an image sensor. In order to provide a wide range of zoom magnification, a movement range of the lens module has to be increased. However, as a movement distance of the lens module increases, the lens module may move in a direction different from an intended direction or a position of the lens module may not be detected accurately, which may cause a problem in a zoom magnification control function or a focus control function.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a lens holder configured to move in the housing in an optical axis direction, and a lens barrel coupled to the lens holder, wherein the lens holder includes a first support structure extending from one side surface in the optical axis direction and a second support structure located on a side surface opposite to the first support structure and extending in the optical axis direction, and wherein the first support structure includes an extension protruding beyond the second support structure in the optical axis direction.

The lens barrel may be symmetric about a plane that includes the optical axis, the plane being perpendicular to a direction in which the first support structure and the second support structure face each other.

The lens barrel may be symmetric about a plane that includes the optical axis, the plane being parallel to a direction in which the first support structure and the second support structure face each other.

The lens holder may be supported in a direction perpendicular to the optical axis, and at least one support point supporting the lens holder may be disposed in the extension.

The at least one support point may include a ball member disposed between the housing and the extension.

The extension may include a guide groove extending in the optical axis direction and accommodating at least a portion of the ball member.

The lens holder may be at least partially supported by a first ball member, a second ball member, and a third ball member disposed between the lens holder and a bottom surface of the housing.

The first ball member may be disposed between the second support structure and the bottom surface, the second ball member may be disposed between a portion of the first support structure corresponding to the second support structure and the bottom surface, and the third ball member may be disposed between the extension of the first support structure and the bottom surface.

The camera module may further include a first magnetic member disposed in a portion of the lens holder facing the bottom surface, and a second magnetic member disposed on the bottom surface and facing the first magnetic member, wherein magnetic attraction may arise between the first magnetic member and the second magnetic member.

The first magnetic member may be disposed within a region surrounded by support points respectively provided in the first ball member, the second ball member, and the third ball member.

The lens holder may further include a lower structure connecting the first support structure and the second support structure and facing the bottom surface, and the first magnetic member may be disposed in the lower structure.

The lens barrel may include a first surface facing the bottom surface and a second surface facing the bottom surface and spaced farther away from the bottom surface than the first surface, and the lower structure may be disposed between the second surface and the bottom surface.

The camera module may further include a stopper disposed in the housing and disposed to face an end of the extension in the optical axis direction.

The camera module may further include a baffle disposed in the lens holder, disposed on one side of the lens barrel, and having an incident hole configured to allow light having passed through the lens barrel to pass therethrough.

The camera module may further include a first reflective member configured to change a direction of light incident in one direction toward the lens barrel.

The camera module may further include an image sensor disposed such that an imaging plane thereof faces in a direction intersecting the optical axis of the lens barrel, and a second reflective member configured to change a direction of light passing through the lens barrel toward the imaging plane.

An electronic device may include the camera module and an image module configured to generate an image signal corresponding to light passing through the lens barrel.

In another general aspect, a camera module includes a housing, a lens holder configured to move in the housing in an optical axis direction, a lens barrel coupled to the lens holder, and a first reflective member configured to change a direction of light incident in a first direction to the optical axis direction, wherein the lens barrel is symmetric about a first plane that includes the optical axis, the first plane being parallel to the first direction, and the lens holder is asymmetric about the first plane.

The lens barrel may be symmetric about a second plane that includes the optical axis, the second plane being perpendicular to the first direction.

In another general aspect, an electronic device includes a camera module, the camera module includes a housing, a lens barrel holder movably disposed in the housing, and including a first support structure on a first side and a second support structure on an opposite side, wherein an extension of the first support structure extends beyond the second support structure in an optical axis direction, and wherein the first support structure is movably supported on the housing by a support point opposite the second support structure and a support point of the extension.

The second support structure may be movably supported on the housing by a support point opposite a region between the support points on the first support structure.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
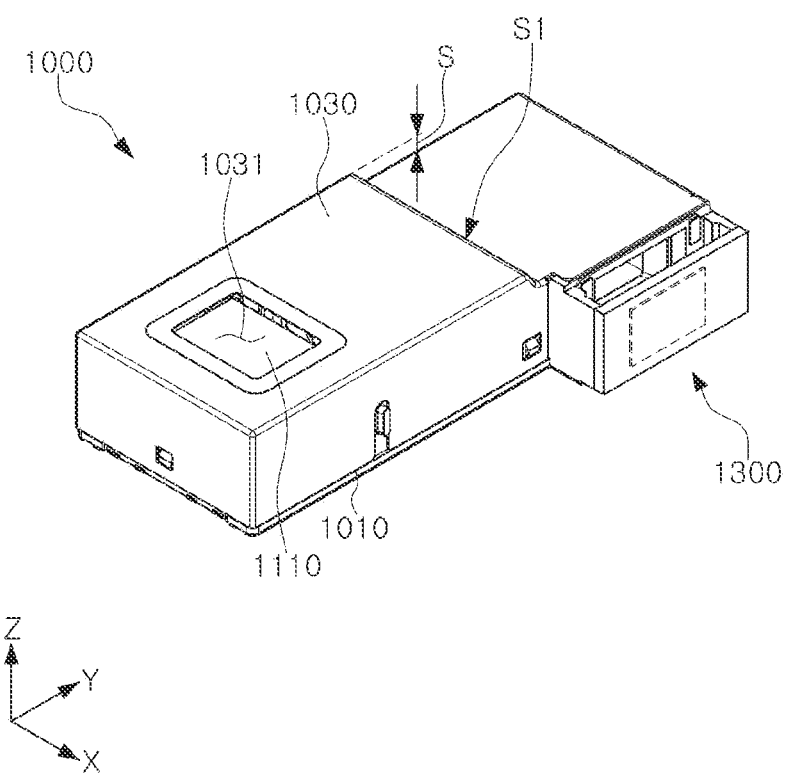
FIG. 1 is a perspective view of a camera module according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

An aspect of the present disclosure is to acquire an image having excellent quality in a camera including a folded module. In particular, an aspect of the present disclosure provides a structure supporting an optical image stabilization (01S) function and/or autofocusing function having excellent performance and contributing to miniaturization and thinning of a camera module.

Specifically, an aspect of the present disclosure is to stably perform a focus control function or a zoom magnification control function even in a camera module providing a high zoom magnification.

Figure 2:
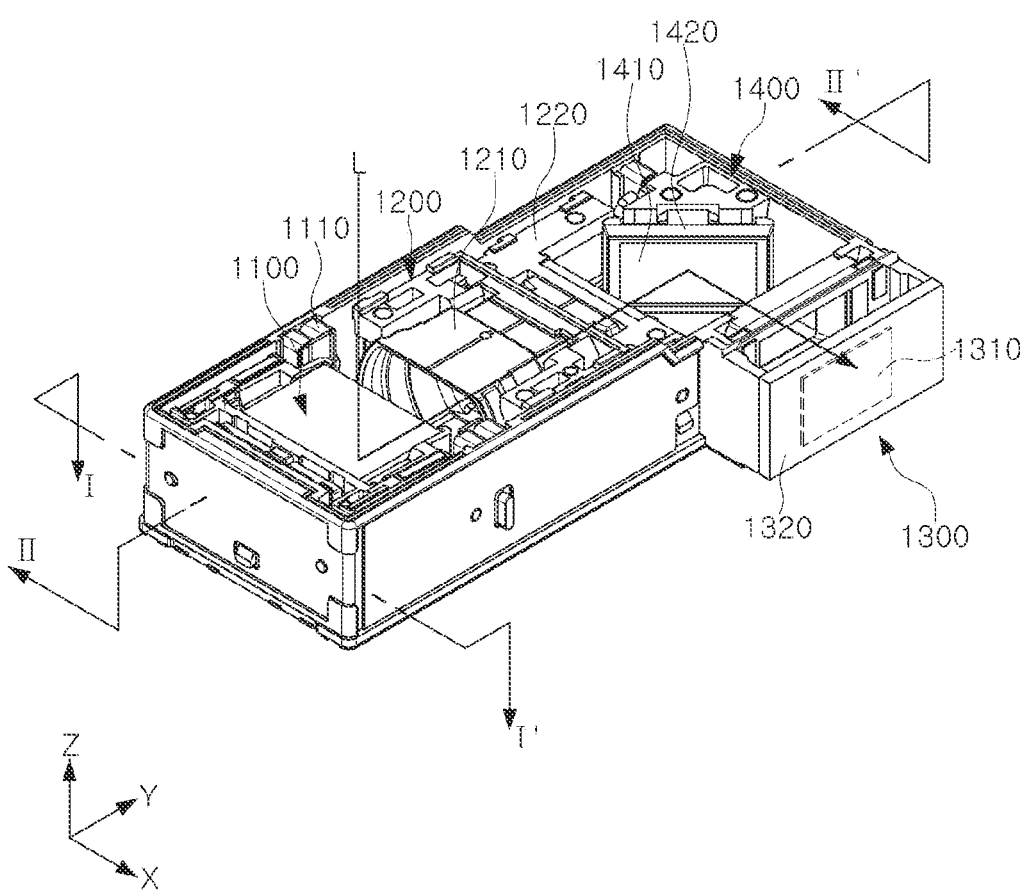
FIG. 2 is a perspective view of a camera module without a cover in an example embodiment.
Figure 3:
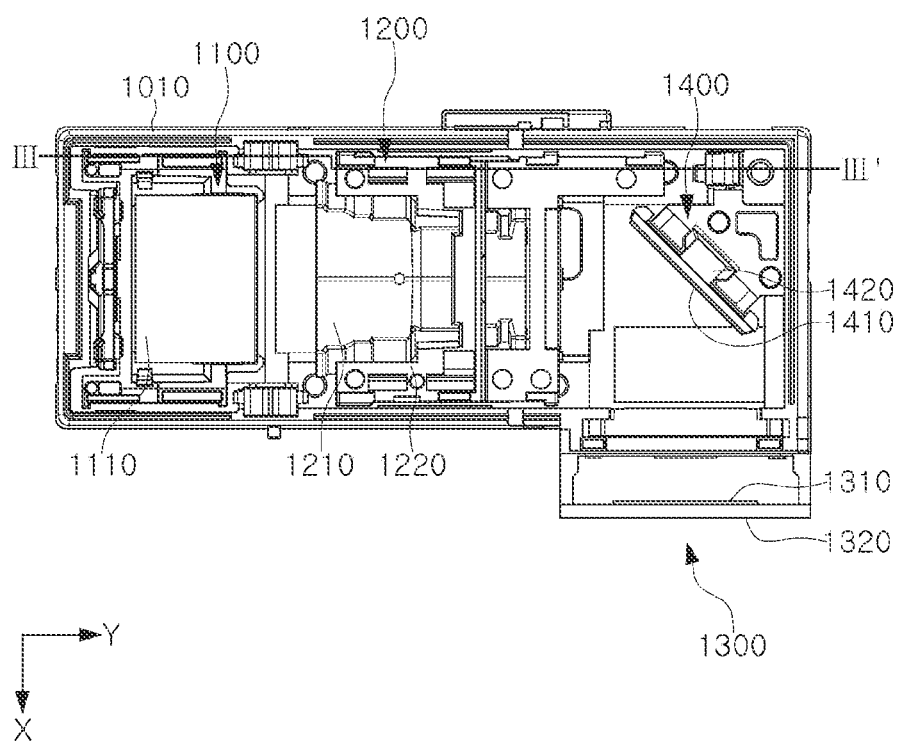
FIG. 3 is a top view of a camera module without a cover according to an example embodiment.
Figure 4:
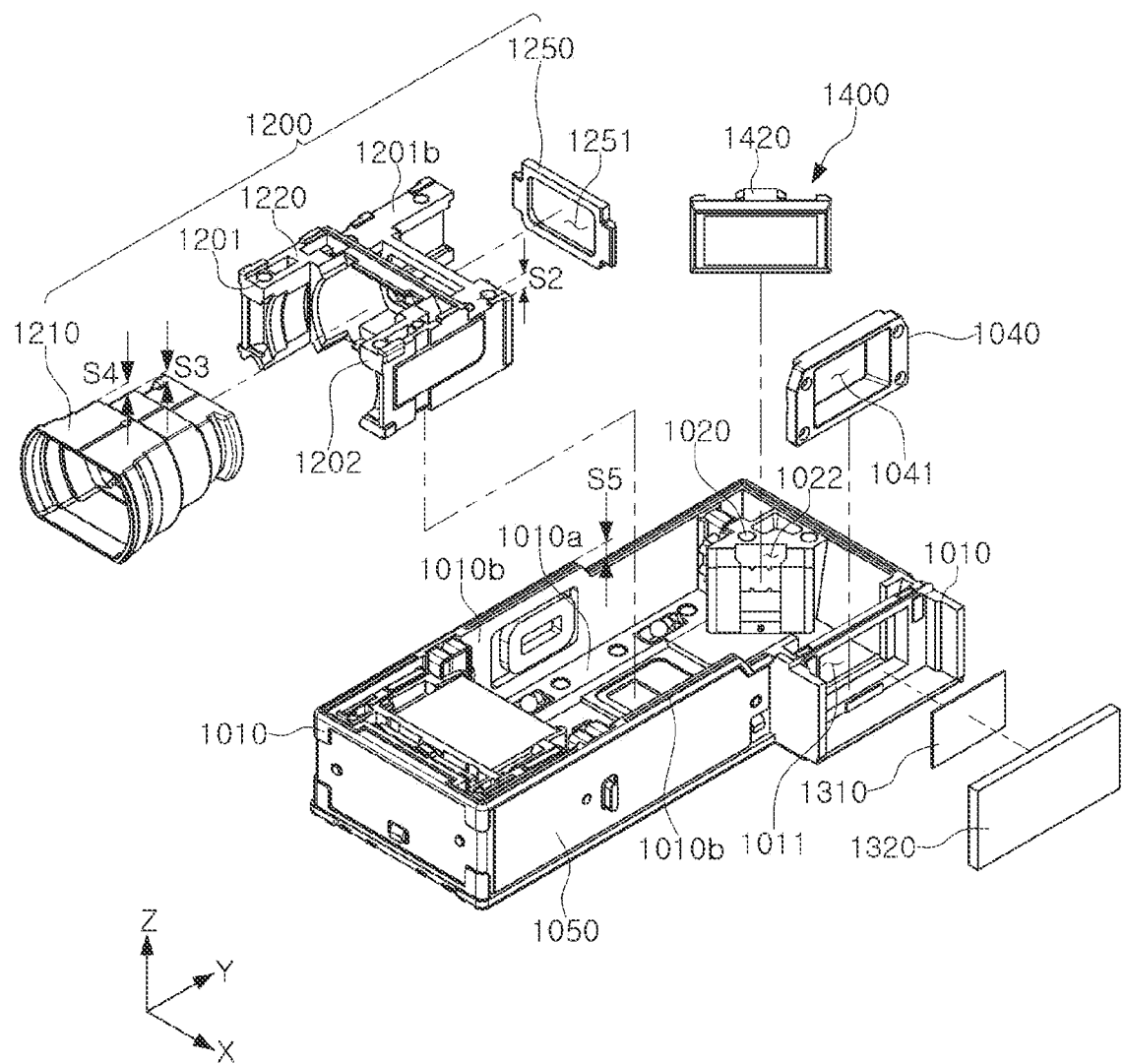
FIG. 4 is an exploded perspective view of a camera module according to an example embodiment.

FIG. 1 is a perspective view of a camera module 1000 in an example embodiment. FIG. 2 is a perspective view of the camera module 1000 in which a cover 1030 is omitted in an example embodiment. FIG. 3 is a top view of the camera module 1000 in which the cover 1030 is omitted in an example embodiment. FIG. 4 is an exploded perspective view of the camera module 1000 according to an example embodiment.

Referring to FIG. 1, an exterior of the camera module 1000 may include a portion of a housing 1010 and the cover 1030. A folded module 1100, a lens module 1200, or an image sensor module 1300 may be provided in a space defined by the housing 1010 and the cover 1030.

Referring to FIG. 1, the cover 1030 may include an opening 1031 for receiving light therein. Light may enter the camera module 1000 through the opening 1031. Referring to FIG. 2, light L entering the opening 1031 may be incident on a first reflective member 1110 of the folded module 1100, and the first reflective member 1110 may reflect the light L. The first reflective member 1110 may be configured to change a direction of light incident in one direction toward a lens barrel 1210.

Referring to FIGS. 2 and 4, in an example embodiment, the camera module 1000 may include the folded module 1100, the lens module 1200, and the image sensor module 1300.

In an example embodiment, the folded module 1100 may be configured to change the direction of the light L. A direction of the light L incident through the opening 1031 of the cover 1030 covering an upper portion of the camera module 1000 may be changed toward the lens module 1200 through the folded module 1100. For example, the light L incident in a thickness direction (Z-axis direction) of the camera module 1000 may be changed in direction to approximately coincide with an optical axis (Y-axis) direction by the folded module 1100. Details of the folded module 1100 will be described with reference to FIGS. 9 to 11.

In an example embodiment, the lens module 1200 may refract the light L reflected from the folded module 1100. The lens module 1200 may include a plurality of lenses arranged along the optical axis, and the light L may be refracted while passing through the plurality of lenses.

Referring to FIG. 4, in an example embodiment, the lens module 1200 may include the lens barrel 1210, and a lens holder 1220. The lens barrel 1210 may include a plurality of lenses therein. The plurality of lenses may have a circular shape or a shape in which edges are cut (so-called D-cut lenses). When the lens barrel 1210 includes D-cut lenses, the exterior of the lens barrel 1210 may also have a shape corresponding to the D-cut lenses.

In an example embodiment, the lens barrel 1210 and the lens holder 1220 may be separate components. For example, after the lens barrel 1210 and the lens holder 1220 are separately manufactured, they may be coupled to each other.

In an example embodiment, the lens module 1200 may further include a baffle 1250 for preventing flare. The baffle 1250 may have a frame shape including an incident hole 1251 therein and may be fit into the lens holder 1220.

In an example embodiment, the baffle 1250 may be disposed in a +Y direction of the lens barrel 1210. The baffle 1250 includes the incident hole 1251 configured to allow light having passed through the lens barrel 1210 to pass therethrough.

A portion of light passing through the lens barrel 1210 may be absorbed by the baffle 1250 or may be diffuse-reflected by the baffle 1250. This may prevent or inhibit an occurrence of flare.

In an example embodiment, the reflective module 1400 may be configured to change a direction of light passing through the lens module 1200 toward an image sensor 1310. The camera module 1000, including the reflective module 1400, may provide a relatively large total track length (TTL) without significantly increasing a length in the optical axis direction (i.e., the length in the Y axis direction). The total track length is defined as a maximum distance between a lens surface closest to an object side among the plurality of lenses provided in the lens module 1200 and a sensor surface of the image sensor. The longer total track length is advantageous in realizing a higher zoom magnification, and therefore the camera module 1000 including the reflective module 1400 may provide a relatively high zoom magnification.

In an example embodiment, an imaging plane of the image sensor 1310 may face a direction (e.g., X-direction) intersecting the optical axis direction of the lens barrel 1210. A second reflective member 1410 may be configured to change a direction of light passing through the lens barrel 1210 toward the imaging plane of the image sensor 1310.

In an example embodiment, the reflective module 1400 may include the second reflective member 1410 and a holder 1420 accommodating the second reflective member 1410. The housing 1010 may include a support structure 1020 capable of accommodating the holder 1420. For example, the support structure 1020 may include a groove 1022 extending in one direction, and the holder 1420 may include a structure corresponding to the groove 1022.

In the camera module 1000 according to example embodiments of the present disclosure, an optical path may be changed at least twice by the folded module 1100 and the reflective module 1400. Referring to FIG. 2, the light L incident on the folded module 1100 in the Z-axis direction may be changed in direction to the Y-axis direction by the first reflective member 1110, and the light L may pass through the lens module 1200 and then may be changed in direction to the X-axis direction by the second reflective member 1410 of the reflective module 1400.

In the illustrated example embodiment, a direction in which the light L passing through the reflective module 1400 is bent is directed to a +X direction, and the image sensor is disposed in the +X direction of the reflective module 1400, but the example embodiment of the present disclosure is not limited thereto, and in other example embodiments, the reflective module 1400 may bend light in various directions. Referring to FIG. 3, a direction in which light passing through the reflective module 1400 is bent may be the −X direction, and in this case, the image sensor module 1300 is provided in the −X direction with respect to the reflective module 1400.

In an example embodiment, the image sensor module 1300 may include an image sensor 1310 and a substrate 1320 on which the image sensor 1310 is mounted. The image sensor 1310 may be disposed such that a light collecting surface (or imaging plane) of the sensor faces the second reflective member 1410 of the reflective module 1400, and generate an image signal corresponding to the light reflected from the second reflective member 1410.

In an example embodiment, the image sensor module 1300 may include an optical filter filtering light incident from the lens module 1200. The optical filter may include an infrared cut filter.

In an example embodiment, the housing 1010 may include an internal space configured to accommodate the folded module 1100, the lens module 1200, and the image sensor module 1300. In an example embodiment, part of the image sensor module 1300 may be provided outside the housing 1010. For example, the substrate 1320 included in the image sensor module 1300 may be attached to the outside of the housing 1010.

In an example embodiment, the housing 1010 may be integrally provided so that the folded module 1100, the lens module 1200, and the image sensor module 1300 are all accommodated in the internal space thereof. However, the present disclosure is not limited thereto, and in another example embodiment, the housing 1010 may have a structure in which the housings 1010 configured to accommodate some of each of the folded module 1100, the lens module 1200, and the image sensor module 1300 are interconnected.

In the illustrated example embodiment, the image sensor module 1300 is provided in the housing 1010, but in another example embodiment, a separate housing 1010 configured to accommodate the image sensor module 1300 may be connected to the housing 1010 accommodating the folded module 1100 and the lens module 1200.

In an example embodiment, a baffle 1040 for preventing flare may be provided in the housing 1010. The baffle 1040 may have a frame shape including a through portion 1041 therein, and may be fit into an internal structure of the housing 1010. The baffle 1040 may have a shape corresponding to an opening 1011 formed in the housing 1010. A portion of light reflected from the second reflective member 1410 and directed to the image sensor 1310 may be absorbed by the baffle 1040 or may be diffuse-reflected by the baffle 1040. This may prevent or inhibit an occurrence of flare.

Meanwhile, as cameras employed in electronic devices provide various functions (e.g., OIS, autofocusing) and high performance, there is a limitation in reducing the thickness of the camera module 1000. A thickness of an electronic device may be determined by the thickness of the camera module 1000.

Figure 12:
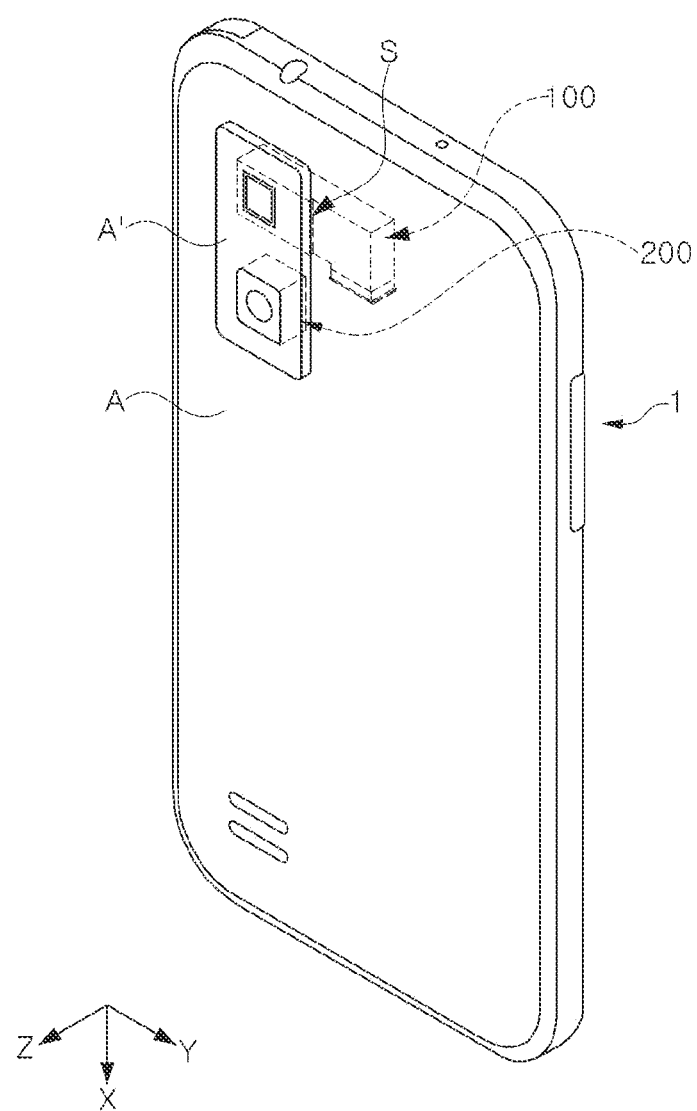
FIG. 12 illustrates a portable device including a camera module according to an example embodiment.

Referring to FIG. 12, a first camera module 100 (corresponding to the camera module 1000 of FIG. 1) is provided on a rear surface A of the electronic device 1 together with a second camera module 200. Since a thickness of the second camera module 200 is large, a portion A' protruding from the rear surface A of the electronic device 1, relative to other portions due to the camera. Since this may impair usability and aesthetics of the exterior, it is important to reduce the area of the protruding portion A'.

The first camera module 100 may include a step portion S like the camera module 1000 of FIG. 1, and the step portion S may contribute to reduction in an area of a protruding portion A' protruding from the rear surface A of the electronic device 1 due to the camera.

In an example embodiment, the camera module 1000 may include a step portion S having a reduced thickness in a middle portion thereof. In an example embodiment, the step portion S may be located approximately in the middle of the camera module 1000. For example, the step portion S may be provided at a point of ⅓ to ⅔ of a length of the camera module 1000 in the optical axis direction. In an example embodiment, the camera module 1000 may be stepped with a boundary on a plane perpendicular to the optical path between the lens module 1200 and the reflective module 1400. For example, the step portion S may be located on the optical path from the frontmost lens of the lens module 1200 adjacent to a subject to the reflective module 1400.

Referring to FIG. 1, the cover 1030 may include a step portion S1 in the Y-axis direction, and the camera module 1000 may have different heights (or thicknesses) based on the step portion S1. In the camera module 1000 according to an example embodiment, a height of the side on which the light-receiving opening 1031 is located with respect to the step portion S may be higher than the opposite side.

Referring to FIG. 4, in an example embodiment, both the lens module 1200 and the housing 1010 may have a step corresponding to the step portion S exposed to the exterior of the camera module 1000.

In an example embodiment, the lens module 1200 may include the lens barrel 1210 and the lens holder 1220 distinguished from each other, each of which may include at least one step (e.g., S2, S3, and S4). For example, the lens holder 1220 may include a second step S2, and the lens barrel 1210 may include a third step S3 and a fourth step S4.

In an example embodiment, the second step S2 of the lens holder 1220 and the third step S3 of the lens barrel 1210 may be provided in positions corresponding to the step portion S exposed to the exterior of the camera module 1000. The fourth step S4 of the lens barrel 1210 may be provided for the convenience of assembling the lens barrel 1210 with the lens holder 1220.

In an example embodiment, the housing 1010 may include a fifth step S5 corresponding to the step portion S. For example, a sidewall 1010b constituting the housing 1010 may have different heights (a length in the Z-axis direction) based on the fifth step S5.

Referring back to FIG. 12, the first camera module 100 is spaced apart from the second camera module 200 in the X-axis direction. The first camera module 100 may include a first portion overlapping the second camera module 200 in the X-axis direction and a second portion which does not overlap. In addition, the first camera module 100 may include a step portion S between the first portion and the second portion. If thicknesses of the first portion and the second portion are the same, a width (a length in the Y-axis direction) of a portion protruding from the rear surface of the electronic device will be greater than a width of the illustrated portion A'. Since the thickness of the second portion in the first camera module 100 is smaller than the thickness of the first portion, the width of the portion A' protruding due to the cameras 100 and 200 may be smaller than a width of the first camera module.

Figure 5:
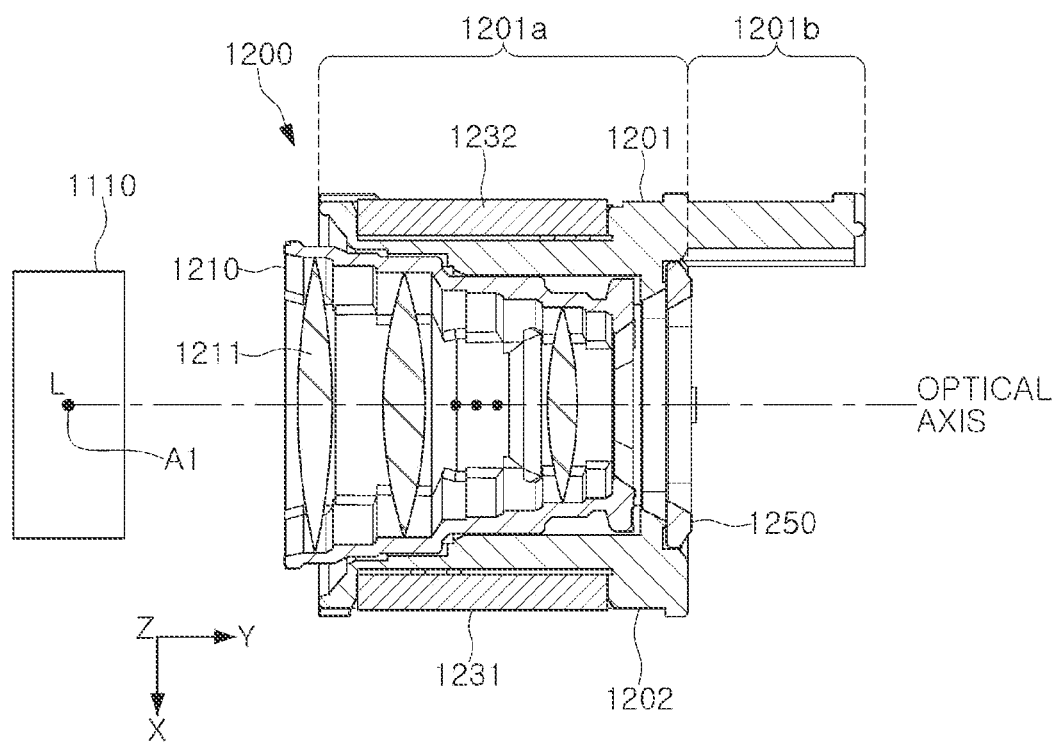
FIG. 5 is a cross-sectional view taken along line I-I' of a lens module in FIG. 2.
Figure 6:
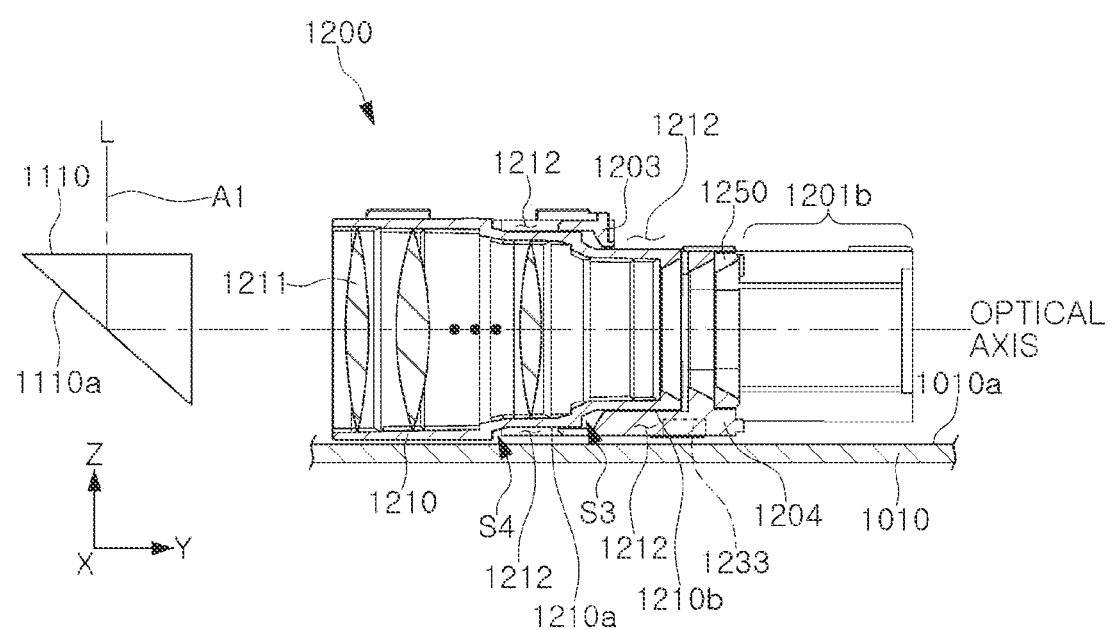
FIG. 6 is a cross-sectional view taken along line II-II' of a lens module in FIG. 2.

FIG. 5 is a cross-sectional view of the lens module 1200, taken along line I-I' in FIG. 2. FIG. 6 is a cross-sectional view of the lens module 1200, taken along line II-II' in FIG. 2.

In an example embodiment, the lens holder 1220 may be configured to accommodate the lens barrel 1210. In an example embodiment, the lens holder 1220 may include a first support structure 1201 and a second support structure 1202 extending in the optical axis direction (the Y-axis direction). The lens barrel 1210 may be accommodated in a space between the first support structure 1201 and the second support structure 1202.

In an example embodiment, the first support structure 1201 and the second support structure 1202 may be disposed in opposite directions with respect to the optical axis. The first support structure 1201 and the second support structure 1202 may face each other with the optical axis therebetween. For example, the first support structure 1201 and the second support structure 1202 may be provided in the form of plates extending in the optical axis direction and facing each other in the X direction.

In an example embodiment, an internal structure of the lens holder 1220 may have a shape corresponding to an external structure of the lens barrel 1210. For example, the lens barrel 1210 may include a curved surface, and portions of the support structures 1201 and 1202 facing the lens barrel 1210 may also include a curved surface corresponding to the curved surface of the lens barrel 1210. For example, the lens barrel 1210 may include a portion stepped in the optical axis direction, and the internal structures of the support structures 1201 and 1202 may also include a step corresponding to the step of the lens barrel 1210.

In an example embodiment, the first support structure 1201 has a longer length in the optical axis direction than the second support structure 1202. For example, the first support structure 1201 may include a first portion 1201*a* facing the second support structure 1202 in the X direction and a second portion (or extension) 1201*b* extending from an end of the first portion 1201*a* in the +Y direction. The first portion 1201*a* of the first support structure 1201 may have the same or substantially the same optical axial length as the second support structure 1202, and due to the second portion 1201*b* of the first support structure 1201, the first support structure 1201 may protrude beyond the second support structure in the +Y direction. Due to the second portion 1201*b*, the first support structure 1201 may protrude beyond the second support structure 1202, rearward (+Y direction) of the lens barrel 1210.

In an example embodiment, the second support structure 1202 may be provided so as not to interfere with light directed from the reflective module 1400 to the image sensor 1310.

In an example embodiment, the lens holder 1220 may include a structure connecting the first support structure 1201 and the second support structure 1202. In an example embodiment, the lens holder 1220 may include an upper structure 1203 connecting an upper portion of the first support structure 1201 and an upper portion of the second support structure 1202. In an example embodiment, the lens holder 1220 may include a lower structure 1204 connecting a lower portion of the first support structure 1201 and a lower portion of the second support structure 1202.

The upper structure 1203 and the lower structure 1204 of the lens holder 1220 may be disposed above (+Z direction) and below (−Z direction) the lens barrel 1210, respectively. The lens barrel 1210 decreases in thickness (length in the Z-axis direction) toward the rear (+Y direction), and the upper structure 1203 and the lower structure 1204 of the lens holder 1220 may be disposed in a space 1212 secured in upper and lower portions of the lens barrel 1210 due to the reduced thickness.

For example, when viewed in the X-axis direction, a thickness of a rear portion of the lens barrel 1210 is smaller than a thickness of a front portion thereof based on the third step S3 or the fourth step S4 as a boundary. A portion of the upper structure 1203 and the lower structure 1204 may be disposed in the space 1212 secured in the upper and lower portions of the lens barrel 1210 due to the reduced thickness of the lens barrel 1210. Accordingly, an increase in the thickness of the lens module 1200 due to the lens barrel 1210 and the lens holder 1220 being provided as separate components may be minimized.

Figure 7:
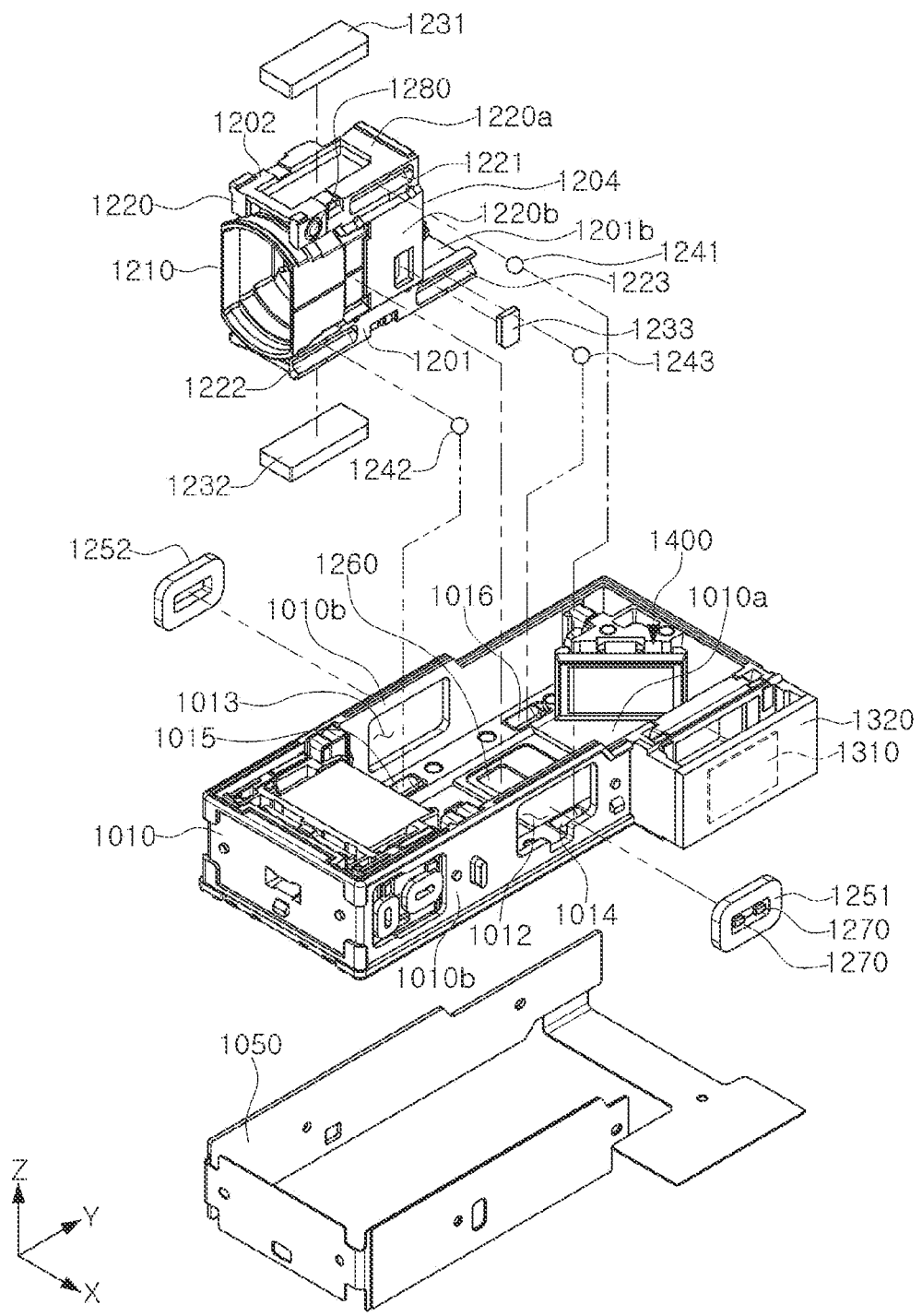
FIG. 7 is an exploded perspective view of a driving unit of a lens module according to an example embodiment.

In an example embodiment, driving elements required for autofocusing may be provided in the lens holder 1220. In an example embodiment, a first magnet 1231 may be provided on the second support structure 1202. In an example embodiment, a second magnet 1232 may be provided on the first support structure 1201. Referring to FIG. 7, in an example embodiment, a first magnetic member 1233 may be provided in the lower structure 1204. The first magnetic member 1233 may be disposed in a portion of the lower structure 1204 facing a bottom surface 1010*a* of the housing 1010.

Referring to FIG. 7, guide grooves 1221, 1222, and 1223 may be disposed on bottom surfaces of the support structures 1201 and 1202. The first support structure 1201 may include a second guide groove 1222 and a third guide groove 1223 on the bottom surface. The second support structure 1202 may include a first guide groove 1221 on the bottom surface.

In an example embodiment, at least a portion of the third guide groove 1223 is provided in the extension 1201*b*, and the third ball member 1243 may slide or roll along the third guide groove 1223. The third ball member 1243 may support the extension 1201*b* and may serve as one of several support points supporting the lens module 1200.

Meanwhile, in order for the camera module 1000 to provide high zoom magnification, the lens barrel 1210 may have a relatively long stroke. In order to stably support the lens barrel 1210 having a long stroke, a distance between support points supporting the lens barrel 1210 has to be large. For example, the lens barrel 1210 may be supported by ball members 1241, 1242, and 1243 disposed between the lens barrel 1210 and the housing 1010, and when an interval between the ball members 1241, 1242, and 1243 is large, the lens module 1200 may move stably without wobbling. The support of the lens module 1200 by the ball members 1241, 1242, and 1243 will be described in detail with reference to FIG. 8.

In an example embodiment, the lens module 1200 may be formed to be asymmetric to increase a distance between the ball members 1241, 1242, and 1243. When viewed in the Z-axis direction, the lens module 1200 may have an asymmetric structure with respect to the optical axis. Referring to FIG. 7, in order to increase the distance between the second ball member 1242 and the third ball member 1243, the first support structure 1201 may include the extension 1201*b* protruding rearwardly of the lens barrel 1210, beyond the second support structure 1202.

As the length of the first support structure 1201 increases, the distance between the second ball member 1242 and the third ball member 1243 may increase and an area of a region surrounded by the ball members 1241, 1242, and 1243 (e.g., a support region T of FIG. 8) may be increased. This may contribute to movement of the lens module 1200 with a relatively long stroke.

Meanwhile, when the lens module 1200 is formed to be asymmetric, the lens barrel 1210 and the lens holder 1220 may be advantageously provided as separate components. Structures constituting the lens module 1200 may be deformed according to an environment in which the lens module 1200 is manufactured or used. As the lens module 1200 is asymmetrically formed, the degree of deformation may become greater. It is important for the lenses 1211 included in the lens module 1200 to be precisely arranged along the optical axis, and due to the above deformation, the lenses 1211 may be misaligned, which may result in deterioration of image quality.

In an example embodiment, the lens barrel 1210 may have a symmetric structure about the optical axis, and the lens holder 1220 provided separately from the lens barrel 1210 may have an asymmetric structure about the optical axis.

In an example embodiment, the lens barrel 1210 may be symmetric about a plane including the optical axis, the plane being perpendicular to a direction (i.e., the X-axis direction) in which the first support structure 1201 and the second support structure 1202 face each other (i.e., the X-axis direction). For example, referring to FIG. 5, the lens barrel 1210 may have a shape symmetric about a plane parallel to a Y-Z plane, the plane including the optical axis. In an example embodiment, the lens barrel 1210 may be configured to be symmetric about a plane including the optical axis and being parallel to the direction in which the first support structure 1201 and the second support structure 1202 face each other. For example, referring to FIG. 6, the lens barrel 1210 may have a symmetric shape about a plane being parallel to an X-Y plane and including the optical axis.

Referring to FIG. 5, light L incident on the first reflective member 1110 in the first direction A1 (e.g., −Z direction) is reflected by a reflective surface 1110*a* of the reflective member 1110 toward the optical axis. In an example embodiment, the lens barrel 1210 may be provided in a symmetric shape about the first plane including the optical axis and being parallel to the first direction. For example, the lens barrel 1210 may have a symmetric shape about a plane which is parallel to the Y-Z plane and includes the optical axis. Referring to FIG. 5, the first support structure 1201 disposed in the −X direction with respect to the optical axis may have a structure different from that of the second support structure 1202 disposed in the +X direction, and thus the lens holder is provided to be asymmetric about the first plane, unlike the lens barrel 1210.

Referring to FIG. 6, in an example embodiment, the lens barrel 1210 may be provided to be symmetric about a plane including the optical axis and being perpendicular to the first direction. In an example embodiment, the lens barrel 1210 may be provided to have a symmetric shape about a plane including the optical axis and being perpendicular to the reflective surface 1110*a* of the first reflective member 1110. For example, referring to FIG. 6, the lens barrel 1210 may have a symmetric shape about a plane being parallel to the X-Y plane and including the optical axis.

In an example embodiment, even if the lens module 1200 has an asymmetric structure to have a long stroke, the lens barrel 1210 has a symmetric structure, so that misalignment of the lenses 1211 may be prevented or minimized.

Figure 8:
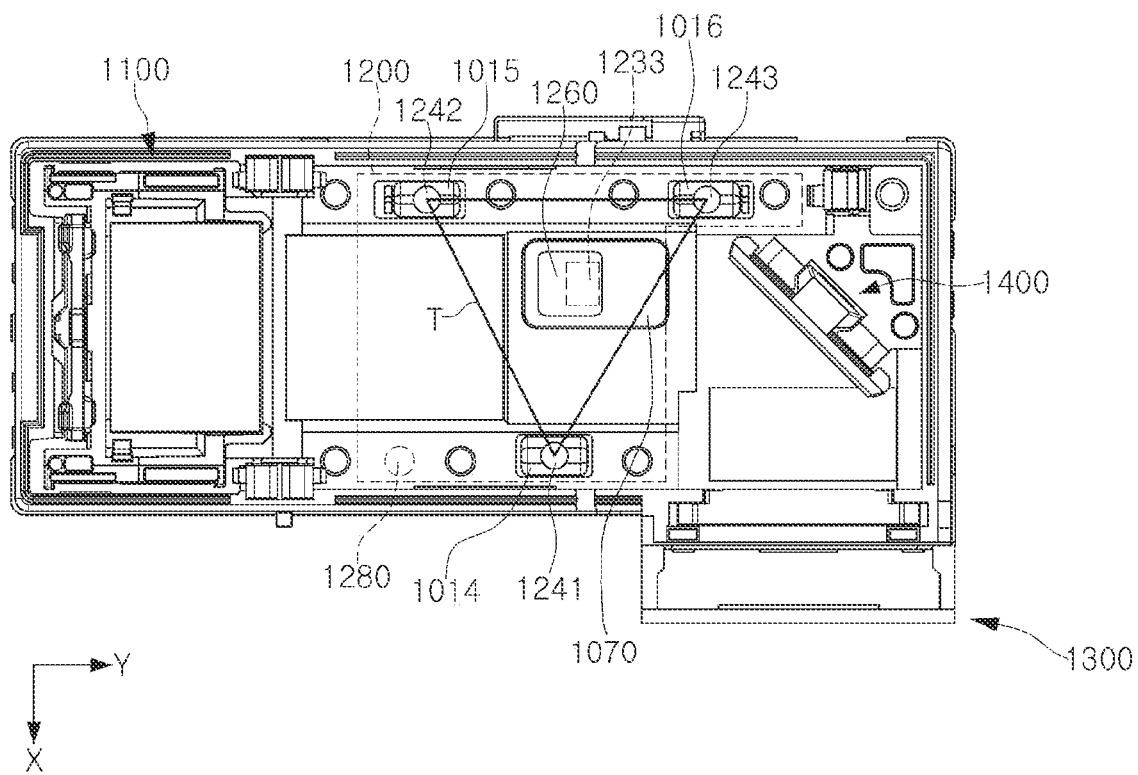
FIG. 8 illustrates a positional relationship between a support point of a lens module and a magnet when a camera module is viewed from above in an example embodiment.

FIG. 7 is an exploded perspective view of a driving unit of the lens module 1200 in an example embodiment. FIG. 8 illustrates a positional relationship between support points of the lens module 1200 and the first magnetic member 1233 when the camera module 1000 is viewed from above in an example embodiment. FIG. 8 is a cross-sectional view of FIG. 3. FIG. 8 is a cross-sectional view of the camera module 1000 taken so that the first magnetic member 1233 provided in the lens module 1200 and a second magnetic member 1260 provided in the housing 1010 appear.

In an example embodiment, the lens module 1200 may be movably provided in the housing 1010. In an example embodiment, a focus or magnification of an image formed on the image sensor 1310 may be adjusted while the lens module 1200 reciprocates with respect to the housing 1010 in one direction. In an example embodiment, the lens module 1200 may move in a direction parallel to the optical axis (Y axis) with respect to the housing 1010.

In an example embodiment, the ball members 1241, 1242, and 1243 and guide grooves 1221, 1222, 1223, 1014, 1015, and 1016 may be used to guide movement of the lens module 1200. The lens module 1200 and the housing 1010 may include the guide grooves 1221, 1222, 1223, 1014, 1015, and 1016 extending in the first direction (Y-axis direction) in portions facing each other, respectively. The ball members 1241, 1242, and 1243 may be disposed between the guide grooves 1221, 1222, 1223, 1014, 1015, and 1016 provided in the lens module 1200 and the housing 1010.

In an example embodiment, since the ball members 1241, 1242, 1243 move only in the direction in which the guide grooves 1221, 1222, 1223, 1014, 1015, and 1016 extend, a motion direction of the lens module 1200 may be limited to a length direction (Y-axis direction) of the guide grooves 1221, 1222, 1223, 1014, 1015, and 1016 with respect to the housing 1010.

In an example embodiment, the lens holder 1220 may include a first guide groove 1221, a second guide groove 1222, and a third guide groove 1223 on the lower surface 1220*b*. The housing 1010 may include a fourth guide groove 1014, a fifth guide groove, and a sixth guide groove 1016 corresponding to the first guide groove 1221, the second guide groove 1222, and the third guide groove 1223 on the bottom surface 1010*a*, respectively. The first ball member 1241 may be disposed between the first guide groove 1221 and the fourth guide groove 1014, and the second ball member 1242 may be disposed between the second guide groove 1222 and the fifth guide groove 1015, and the third ball member 1243 may be disposed between the third guide groove 1223 and the sixth guide groove 1016.

In an example embodiment, the camera module 1000 may include a driving unit providing driving force to the lens module 1200. In an example embodiment, the driving unit may include magnets 1231 and 1232 provided in the lens module 1200 and coils 1251 and 1252 provided in the housing 1010.

In an example embodiment, the first magnet 1231 and the second magnet 1232 may be provided on a side surface 1220*a* of the lens holder 1220. The housing 1010 may include a first coil 1251 and a second coil 1252 corresponding to the first magnet 1231 and the second magnet 1232, respectively. The lens module 1200 may reciprocate with respect to the housing 1010 in one direction through electromagnetic interaction between the coils 1251 and 1252 and the magnets 1231 and 1232. For example, Lorentz force generated in the coils 1251 and 1252 and the magnets 1231 and 1232 may cause the lens module 1200 to move with respect to the housing 1010 in one direction.

In an example embodiment, the first coil 1251 and the second coil 1252 may be attached to a substrate 1050 disposed on an external surface of the housing 1010. The first coil 1251 and the second coil 1252 attached to the substrate 1050 may interact with the first magnet 1231 and the second magnet 1232 through openings 1012 and 1013 provide in the housing 1010, respectively. The openings 1012 and 1013 provided in the housing 1010 may be provided with sizes corresponding to the first coil 1251 and the second coil 1252.

In an example embodiment, the lens holder 1220 has to move in a state of being in close contact with the housing 1010. In other words, while the lens holder 1220 moves with respect to the housing 1010, the ball members 1241, 1242, 1243 have to maintain contact with the guide grooves 1221, 1222, 1223, 1014, 1015, and 1016 provided on both sides. Referring to FIG. 7, the first ball member 1241 has to maintain contact with the first guide groove 1221 and the fourth guide groove 1014, the second ball member 1242 has to maintain contact with the second guide groove 1222 and the fifth guide groove 1015, and the third ball member 1243 has to maintain contact with the third guide groove 1223 and the sixth guide groove 1016. If any one of the first ball member 1241, the second ball member 1242, or the third ball member 1243 is released from the guide grooves 1221, 1222, 1223, 1014, 1015, and 1016, a motion direction of the lens holder 1220 is no longer limited to one direction. For example, the lens holder 1220 has to move only in the Y-axis direction, but when the contact between the ball members 1241, 1242, and 1243 and the guide grooves 1221, 1222, 1223, 1014, 1015, and 1016 is released, the lens holder 1220 may wobble in the Z-axis direction or even in the X-axis direction. This may result in deterioration of the autofocusing function and image quality.

Accordingly, the housing 1010 and the lens holder 1220 may each include elements that pull each other. In an example embodiment, the lens holder 1220 and the housing 1010 may include at least one magnetic member 1233 and 1260 in portions facing each other.

A combination of the magnetic members 1233 and 1260 provided in the lens holder 1220 and the housing 1010 may be configured to generate a magnetic attraction therebetween. For example, the magnetic member 1260 provided in the housing 1010 may be a magnet, and the first magnetic member 1233 provided in the lens holder 1220 may be a magnet or a yoke. As another example, the magnetic member 1260 provided in the housing 1010 may be a yoke, and the first magnetic member 1233 provided in the lens holder 1220 may be a magnet.

Referring to FIG. 7, the first magnetic member 1233 may be provided on the lower surface 1220b of the lens holder 1220, and the second magnetic member 1260 may be provided on the bottom surface 1010a of the housing 1010. The lens holder 1220 may include a depression for accommodating the first magnetic member 1233.

Referring to FIG. 8, the second magnetic member 1260 may be provided outside the housing 1010, and the housing 1010 may provide an opening 1070 through which a portion of the second magnetic member 1260 is exposed to the inside of the housing 1010. A portion of the housing 1010 may be disposed between the first magnetic member 1233 and the second magnetic member 1260 according to driving of the lens module 1200, but magnetic attraction between the first magnetic member 1233 and the second magnetic member 1260 may still occur.

A force pulling the lens holder 1220 to the bottom surface 1010a of the housing 1010 may continuously act on the lens holder 1220 due to the magnetic members 1233 and 1260, and accordingly, the lens holder 1220 may move in a state of being in close contact with the bottom surface 1010a of the housing 1010. That is, magnetic attraction based on the magnetic members 1233 and 1260 may help the ball members 1241, 1242, and 1243 maintain contact with the guide grooves 1221, 1222, 1223, 1014, 1015, and 1016 provided on both sides thereof.

In an example embodiment, the lens holder 1220 may be formed to be asymmetric. Referring to FIGS. 4 and 7, in an example embodiment, the lens holder 1220 may include the extension 1201b extending in the optical axis direction. The lens holder 1220 may include two support structures (or sidewalls) 1201 and 1202 surrounding the lens barrel 1210 from both sides with respect to the optical axis. A length of one side support structure 1201 in the optical axis direction may be longer than a length of the other side support structure 1202 in the optical axis direction. Here, a portion in the one side support structure 1201 extending longer in the optical axis direction than the length of the other support structure 1202 may be defined as the extension 1201b.

In an example embodiment, the lens holder 1220 may be in close contact with the bottom surface 1010a of the housing 1010, while having at least three or more support points. In an example embodiment, at least one support point may exist in the extension 1201b of the lens holder 1220. For example, at least a portion of the third guide groove 1223 may be provided in the extension 1201b, and the third ball member 1243 partially accommodated in the third guide groove 1223 may provide one support point.

In an example embodiment, the lens holder 1220 may be at least partially supported by the first ball member 1241, the second ball member 1242, and the third ball member 1243 disposed between the lens holder 1220 and the bottom surface 1010a of the housing 1010. The first ball member 1241 may be disposed between the second support structure 1202 and the bottom surface 1010a, the second ball member 1242 may be disposed between a portion of the first support structure 1201 corresponding to the second support structure 1202 and the bottom surface 1010a (e.g., between the first portion 1201a of FIG. 5 and the bottom surface 1010a), and the third ball member 1243 may be disposed between the extension 1201b of the first support structure 1201 and the bottom surface 1010a.

Here, one support point does not mean one point physically, and may include two or more contact points disposed to be close to each other. For example, when the third guide groove 1223 has a V-shaped cross section, the third ball member 1243 may have two contact points with the third guide groove 1223, and these two contact points may form a single support point. As another example, when the third guide groove 1223 has a wide bottom surface, the third ball member 1243 may have one contact point with the bottom surface of the third guide groove 1223, and one contact point may form a single support point.

Referring to FIG. 8, the second magnetic member 1260 may be configured to cover the entire movement section of the first magnetic member 1233. For example, a length of the second magnetic member 1260 in the Y-axis direction may correspond to a movement section of the first magnetic member 1233. Even if the first magnetic member 1233 moves according to driving of the lens module 1200, the first magnetic member 1233 may always be disposed on the second magnetic member 1260 and magnetic attraction may always be formed between the first magnetic member 1233 and the second magnetic member 1260.

Referring to FIG. 8, the first magnetic member 1233 may be positioned within a triangular region T defined by the ball members 1241, 1242, and 1243. In an example embodiment, the second magnetic member 1260 may also be positioned within the triangular region T defined by the ball members 1241, 1242, and 1243.

Referring to FIGS. 6 and 7, in an example embodiment, the lens holder 1220 may further include the lower structure 1204 connecting the first support structure 1201 and the second support structure 1202 and facing the bottom surface 1010*a*, and the first magnetic member 1233 may be provided in the lower structure 1204. In an example embodiment, the lens barrel 1210 may include the first surface 1210*a* facing the bottom surface 1010*a* and the second surface 1210*b* facing the bottom surface 1010*a*, the second surface being spaced away from the bottom surface 1010*a* farther than the first surface 1210*a* in the +Z direction. The third step S3 is provided between the second surface 1210*b* and the first surface 1210*a*. In this case, the lower structure 1204 may be disposed between the second surface 1210*b* and the bottom surface 1010*a*.

Meanwhile, it is advantageous for the stable driving of the lens module 1200 that the first magnetic member 1233 is positioned within the support region T defined by the ball members 1241, 1242, and 1243. For example, assuming that a distance between the second ball member 1242 and the third ball member 1243 is narrower than the distance illustrated in the example embodiment, when the first magnetic member 1233 moves in the Y-axis direction, the first magnetic member 1233 may be disposed at an edge of the support region T or in a position deviated from the support region T. In this case, the lens module 1200 may be inclined by magnetic attraction between the first magnetic member 1233 and the second magnetic member 1260 and the contacting of the ball members 1241, 1242, and 1243 with respect to the guide grooves 1221, 1222, 1223, 1014, 1015, and 1016 may be released. In particular, since a driving length of the lens module 1200 in the camera module 1000 providing high zoom magnification is relatively large, if the support region T is narrow, the possibility of the above problem may be higher.

In an example embodiment, the lens module 1200 may include the extension 1201*b*, and a portion of the extension 1201*b* may define the third guide groove 1223. As the third ball member 1243 is provided in the third guide groove 1223 provided in the extension 1201*b*, a distance between the second ball member 1242 and the third ball member 1243 may be designed to be relatively large. When the distance between the second ball member 1242 and the third ball member 1243 increases, the area of the support region T defined by the ball members 1241, 1242, and 1243 may increase, which means that a range in which first magnetic member 1233 may move may be increased.

Accordingly, the lens module 1200 having a relatively long driving length may also be stably supported by the housing 1010. In addition, even if the driving distance of the lens module 1200 increases in order to provide high zoom magnification, the lens module 1200 may be stably driven according to example embodiments of the present disclosure.

In an example embodiment, the first magnetic member 1233 may be provided on the lower surface of the lens holder 1220 and may be disposed to be closer to the first support structure 1201 than the second support structure 1202. For example, the first magnetic member 1233 may be disposed closer to the second guide groove 1222 and the fifth guide groove 1015 (or the third guide groove 1223 and the sixth guide groove 1016) than the first guide groove 1221 and the fourth guide groove 1014. The lens holder 1220 may be supported by three ball members 1241, 1242, and 1243, and two ball members 1242 and 1243 among the three ball members 1241, 1242, and 1243 may be disposed in the guide grooves 1222 and 1223 provided in the first support structure 1201.

It is advantageous for the lens holder 1220 to be stably supported when the first magnetic member 1233 is disposed closer to the first support structure 1201. Referring to FIG. 8, the first magnetic member 1233 moves along the optical axis (Y-axis) and is located close to the side defined by the second ball member 1242 and the third ball member 1243, the range in which the first magnetic member 1233 may move within the support region T defined by the ball members 1241, 1242, and 1243 may be increased.

Meanwhile, as the lens module 1200 moves with respect to the housing 1010, the ball members 1241, 1242, 1243 may also roll in the same direction, which means that the support region T also moves along the housing 1010. However, since the distance over which the ball members 1241, 1242, and 1243 roll merely coincides with a movement distance of the lens module 1200 and the distance over which the centers of the ball members 1241, 1242, and 1243 have moved does not reach the moving distance of the lens module 1200, and therefore, it is still important that the ball members 1241, 1242, and 1243 provide the large support region T. Therefore, the extension 1201*b* and the ball member 1243 provided in the extension 1201*b* still contribute to stably supporting the lens module 1200.

In example embodiments of the present disclosure, one of the support points is disposed in the extension 1201*b*, and the support point does not need to be provided as a combination (e.g., the first ball member 1241, the first guide groove 1221, and the fourth guide groove 1014) of the ball member and the guide groove. For example, the extension 1201*b* may include a portion protruding toward the bottom surface 1010*a* of the housing 1010, and one of the support points of the lens module 1200 may be provided by the protrusion. As another example, a protrusion extending from the bottom surface 1010*a* of the housing 1010 toward the extension 1201*b* may provide a support point to the lens module 1200.

In an example embodiment, in addition to the three ball members 1241, 1242, and 1243, other structures may partially support the lens module 1200. In an example embodiment, the lens holder 1220 may include a protrusion 1280 protruding toward the bottom surface 1010*a* of the housing 1010 on the lower surface 1220*b* of the support structure 1202. The protrusion 1280 may serve to support the lens module 1200 adjunctively. When the lens module 1200 is attached to the housing 1010, an air gap may exist between the end of the protrusion 1280 and the bottom surface 1010*a* of the housing 1010. When a strong impact is applied to the lens module 1200, the protrusion 1280 may support the lens module 1200 together with the ball members 1241, 1242, and 1243. In another example embodiment, the protrusion 1280 may be replaced with guide grooves respectively provided in the housing 1010 and the lens holder 1220, and provided with ball members.

Figure 9:
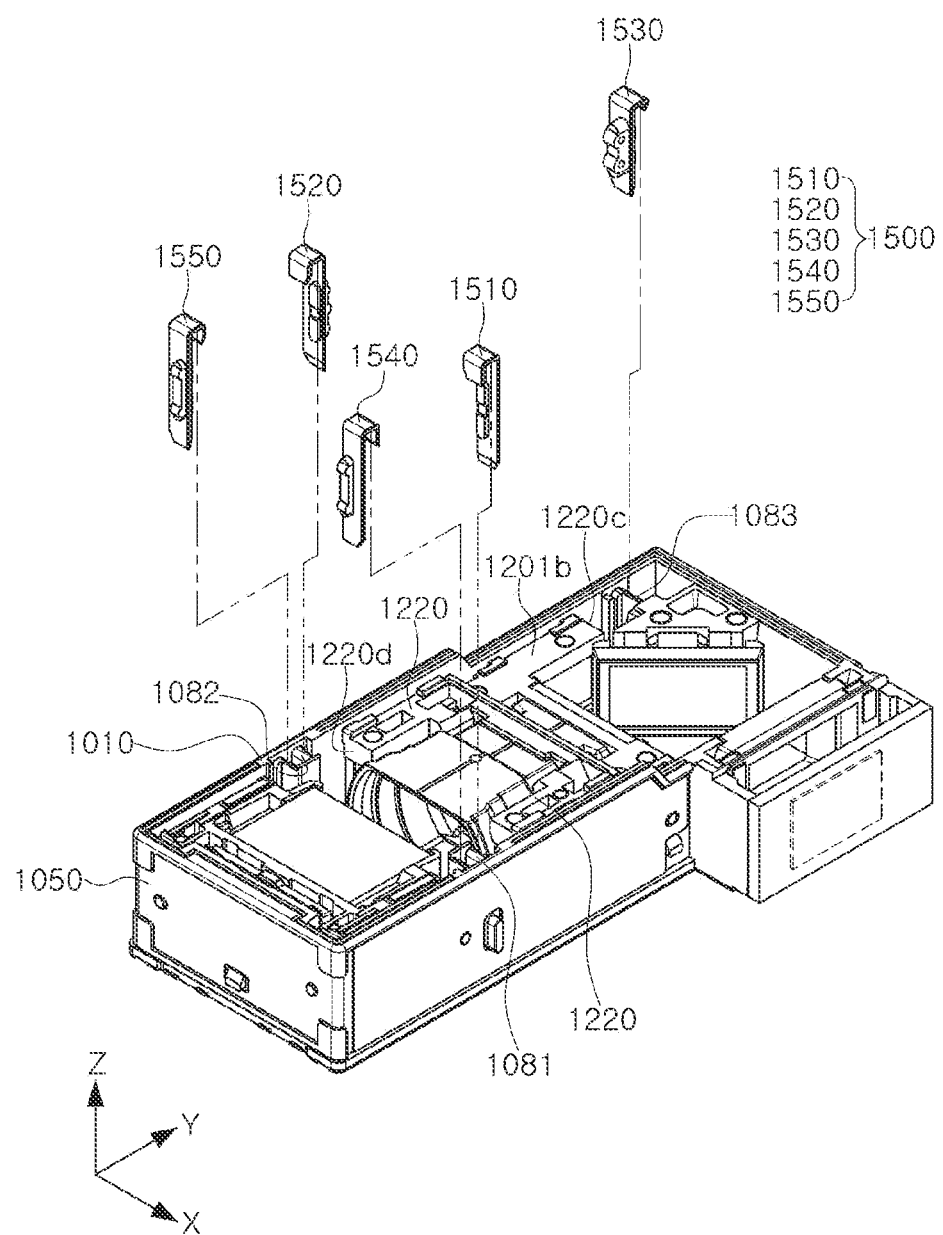
FIG. 9 illustrates stoppers provided in a camera module in an example embodiment.
Figure 10:
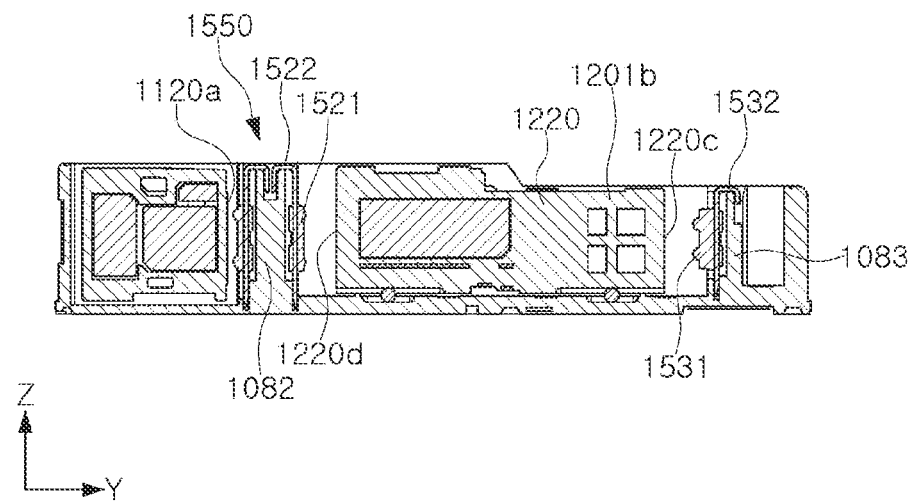
FIG. 10 is a cross-sectional view taken along line III-III' of FIG. 3.

FIG. 9 illustrates stoppers provided in the camera module 1000 in an example embodiment. FIG. 10 is a cross-sectional view III-III' of FIG. 3. FIG. 10 is a cross-sectional view of the camera module 1000 taken so that the stoppers appear.

A range in which the folded module 1100 or the lens module 1200 may move within the housing 1010 is limited. The range of motion of the folded module 1100 or the lens module 1200 may be limited by the internal structure of the housing 1010.

Referring to FIG. 9, the housing 1010 may include arresting protrusions 1081, 1082, and 1083 protruding inward. When the lens module 1200 moves in the optical axis direction (Y-axis direction), the lens module 1200 may touch the arresting protrusions 1081, 1082, and 1083, which may determine upper and lower limits of the movement range of the lens module 1200. In the illustrated example embodiment, a first arresting protrusion 1081 and a second arresting protrusion 1082 may be provided on one side of the lens module 1200, and a third arresting protrusion 1083 may be disposed on the other side of the lens module 1200. In an example embodiment, the first arresting protrusion 1081 and the second arresting protrusion 1082 may also serve to determine a rotation range of the folded module 1100.

However, when the lens module 1200 or the folded module 1100 is at the upper or lower limit of the range of motion, noise may occur as the lens module 1200 or the folded module 1100 touches the internal structure of the housing 1010. In this case, the internal structure of the housing 1010, the lens module 1200, or the folded module 1100 may be damaged due to a large number of impacts or repeated collisions.

In an example embodiment, the camera module 1000 may include a stopper 1500 between the housing 1010 and the lens module 1200 (or the folded module 1100) to reduce noise and impact.

In an example embodiment, the stopper 1500 may be disposed between the lens module 1200 (or the folded module 1100) and the housing 1010. Even if the lens module 1200 (or the folded module 1100) moves to one side as much as possible, the end of the lens module 1200 (or the folded module 1100) does not directly hit the housing 1010 but hits the stopper 1500. The stopper 1500 may include a material having elasticity to act as a buffer.

Referring to FIG. 10, in an example embodiment, the stopper may include a buffer member (e.g., 1521 or 1531) and a fastening member (e.g., 1522 or 1532) for fixing the buffer member to the housing 1010. The fastening member may be coupled to an internal structure of the housing 1010. For example, the buffer member may be formed of rubber, silicone, or the like.

Referring to FIGS. 9 and 10, in an example embodiment, a first stopper 1510, a second stopper 1520, and a third stopper 1530 may be provided in the first arresting protrusion 1801, the second arresting protrusion 1082, and the third arresting protrusion 1083, respectively. In an example embodiment, ends 1220c and 1220d of the lens module 1200 may hit the stopper 1500, without directly hitting the arresting protrusions 1081, 1082, and 1083, and thus, noise or damage that may occur as the lens module 1200 hits the arresting protrusions 1081, 1082, and 1083 may be suppressed or prevented.

In an example embodiment, the third stopper 1530 may be disposed to face the end 1220c of the extension 1201b of the lens holder 1220 in the optical axis direction. For example, when the lens holder 1220 moves in the +Y direction, the end 1220c of the extension 1201b may collide with the third stopper 1530, and accordingly, a movement range of the lens holder 1220 in the +Y direction may be limited.

Referring to FIG. 9, a fourth stopper 1540 and a fifth stopper 1550 may be provided in the first arresting protrusion 1081 and the second arresting protrusion 1082. The end of the folded module 1100 (e.g., 1120a in FIG. 10) may hit the stoppers 1540 and 1550, without directly hitting the first arresting protrusion 1081 and the second arresting protrusion 1082, and thus, noise or damage that may occur as the folded module 1100 hits the arresting protrusions 1081 and 1082 may be suppressed or prevented.

Figure 11:
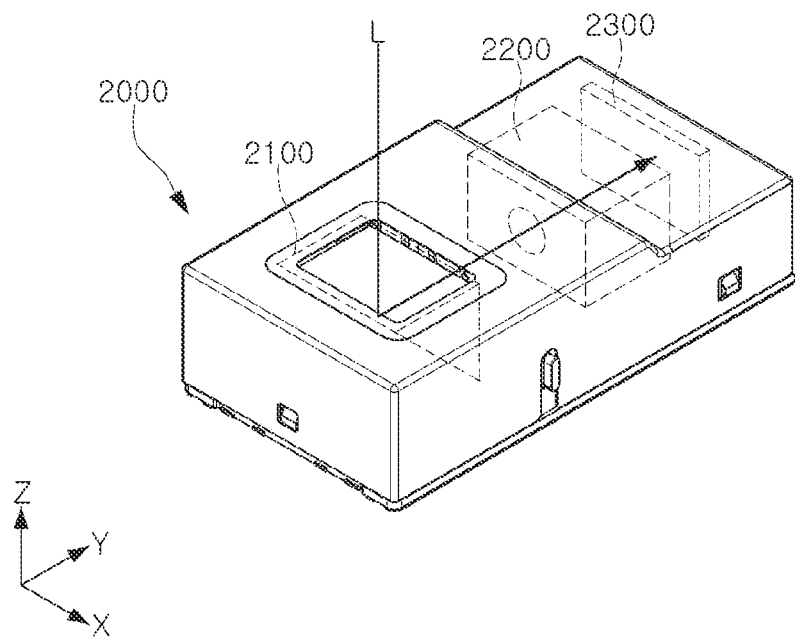
FIG. 11 schematically illustrates a camera module in which a direction of light is changed once.

FIG. 11 schematically illustrates a camera module 2000 in which a direction of light is changed once.

The camera module 2000 of FIG. 11 does not include the reflective module 1400, unlike the camera module 1000 of FIGS. 1 to 10. Light L incident on the folded module 2100 is changed by approximately 90 degrees only once and reaches the image sensor 2300.

The lens module 1200 or the folded module 1100 described above with reference to FIGS. 1 to 10 may also be similarly applied to the camera module 2000 illustrated in FIG. 11.

The lens module 1200 described above with reference to FIGS. 4 to 6 may also be applied to the camera module 2000 of FIG. 11. For example, the lens module 2200 may include a lens barrel and a lens holder, and the lens holder may be asymmetrically formed.

FIG. 12 illustrates a portable device 1 including the camera module 1000 in an example embodiment.

Referring to FIG. 12, the portable electronic device 1 according to an example embodiment in the present disclosure may be a portable electronic device such as a mobile communication terminal, a smartphone, or a tablet PC equipped with the first camera module 100 (e.g., the camera module 1000 of FIG. 1 or the camera module 2000 of FIG. 11).

In this example embodiment, the optical axis of the lens module in the first camera module 100 may face a direction perpendicular to a thickness direction of the portable electronic device 1.

Therefore, even if the first camera module 100 is equipped with functions such as autofocusing (AF), zooming, and optical image stabilization (OIS), the thickness of the portable electronic device 1 may not be increased. Accordingly, the portable electronic device 1 may become compact.

In an example embodiment, the portable electronic device 1 may be equipped with two or more camera modules to image a subject. For example, the portable electronic device may further include the second camera module 200 together with the first camera module 100.

In the case of using two camera modules 100 and 200, incident holes through which light is incident to the two camera modules 100 and 200 may be disposed as close to each other as possible. Unlike the illustrated example embodiment, the positions of the first camera module 100 and the second camera module 200 may be interchanged.

In an example embodiment, the first camera module 100 and the second camera module 200 may be configured to have different angles of view. The first camera module 100 may be configured to have a relatively narrow angle of view (e.g., a telephoto camera), and the second camera module 200 may be configured to have a relatively wide angle of view (e.g., a wide-angle camera).

As set forth above, according to an example embodiment in the present disclosure, the camera may provide an image having excellent quality. In particular, the present disclosure may provide an excellent OIS function and autofocusing function, and miniaturization or thinning of a camera module. Specifically, even in a camera module providing high zoom magnification, autofocusing function and zoom magnification control function may be stably performed.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a lens holder configured to move in the housing in an optical axis direction; and
a lens barrel coupled to the lens holder,
wherein the lens holder comprises a first support structure extending from one side surface in the optical axis direction; and a second support structure located on a side surface opposite to the first support structure and extending in the optical axis direction, and wherein the first support structure comprises an extension protruding beyond the second support structure in the optical axis direction.

2. The camera module of claim 1, wherein the lens barrel is symmetric about a plane that includes the optical axis, the plane being perpendicular to a direction in which the first support structure and the second support structure face each other.

3. The camera module of claim 1, wherein the lens barrel is symmetric about a plane that includes the optical axis, the plane being parallel to a direction in which the first support structure and the second support structure face each other.

4. The camera module of claim 1, wherein the lens holder is supported in a direction perpendicular to the optical axis, and at least one support point supporting the lens holder is disposed in the extension.

5. The camera module of claim 4, wherein the at least one support point comprises a ball member disposed between the housing and the extension.

6. The camera module of claim 5, wherein the extension comprises a guide groove extending in the optical axis direction and accommodating at least a portion of the ball member.

7. The camera module of claim 1, wherein
the lens holder is at least partially supported by a first ball member, a second ball member, and a third ball member disposed between the lens holder and a bottom surface of the housing, and
the first ball member is disposed between the second support structure and the bottom surface, the second ball member is disposed between a portion of the first support structure corresponding to the second support structure and the bottom surface, and the third ball member is disposed between the extension of the first support structure and the bottom surface.

8. The camera module of claim 7, further comprising:
a first magnetic member disposed in a portion of the lens holder facing the bottom surface; and
a second magnetic member disposed on the bottom surface and facing the first magnetic member,
wherein magnetic attraction arises between the first magnetic member and the second magnetic member.

9. The camera module of claim 8, wherein the first magnetic member is disposed within a region surrounded by support points respectively provided in the first ball member, the second ball member, and the third ball member.

10. The camera module of claim 8, wherein the lens holder further comprises a lower structure connecting the first support structure and the second support structure and facing the bottom surface, and the first magnetic member is disposed in the lower structure.

11. The camera module of claim 10, wherein the lens barrel comprises a first surface facing the bottom surface and a second surface facing the bottom surface and spaced farther away from the bottom surface than the first surface, and the lower structure is disposed between the second surface and the bottom surface.

12. The camera module of claim 1, further comprising a stopper disposed in the housing and disposed to face an end of the extension in the optical axis direction.

13. The camera module of claim 1, further comprising a baffle disposed in the lens holder, disposed on one side of the lens barrel, and comprising an incident hole configured to allow light having passed through the lens barrel to pass therethrough.

14. The camera module of claim 1, further comprising a first reflective member configured to change a direction of light incident in one direction toward the lens barrel.

15. The camera module of claim 1, further comprising:
an image sensor disposed such that an imaging plane thereof faces in a direction intersecting the optical axis of the lens barrel; and
a second reflective member configured to change a direction of light passing through the lens barrel toward the imaging plane.

16. An electronic device comprising:
the camera module of claim 1; and
an image module configured to generate an image signal corresponding to light passing through the lens barrel.

17. A camera module comprising:
a housing;
a lens holder configured to move in the housing in an optical axis direction;
a lens barrel coupled to the lens holder; and
a first reflective member configured to change a direction of light incident in a first direction to the optical axis direction,
wherein the lens barrel is symmetric about a first plane that includes the optical axis, the first plane being parallel to the first direction, and the lens holder is asymmetric about the first plane.

18. The camera module of claim 17, wherein the lens barrel is symmetric about a second plane that includes the optical axis, the second plane being perpendicular to the first direction.

19. An electronic device comprising:
the camera module of claim 17; and
an image sensor module configured to generate an image signal corresponding to light passing through the lens barrel.

20. An electronic device comprising:
a camera module, the camera module comprising:
a housing;
a lens barrel holder movably disposed in the housing, and comprising:
a first support structure on a first side and a second support structure on an opposite side, both the first and second support structures being extended in an optical axis direction,
wherein an extension of the first support structure extends beyond the second support structure in the optical axis direction, and
wherein the first support structure is movably supported on the housing by a support point opposite the second support structure and a support point of the extension.

21. The electronic device of claim 20, wherein the second support structure is movably supported on the housing by a support point opposite a region between the support points on the first support structure.

* * * * *